US012572608B2

(12) United States Patent
Zhang et al.

(10) Patent No.: US 12,572,608 B2
(45) Date of Patent: Mar. 10, 2026

(54) METHOD AND APPARATUS FOR PROCESSING HISTORICAL BROWSING CONTENT ELECTRONIC DEVICE AND STORAGE MEDIUM

(71) Applicant: TENCENT TECHNOLOGY (SHENZHEN) COMPANY LIMITED, Guangdong (CN)

(72) Inventors: Pengyuan Zhang, Shenzhen (CN); Xiangli Meng, Shenzhen (CN); Jianqin Meng, Shenzhen (CN); Tianyi Liang, Shenzhen (CN); Yifu Wang, Shenzhen (CN); Di Wu, Shenzhen (CN); Lingbo Cai, Shenzhen (CN); Xuan Ye, Shenzhen (CN); Yuxuan Zheng, Shenzhen (CN); Minglong Zhang, Shenzhen (CN); Yi Zheng, Shenzhen (CN); Shangtao Liang, Shenzhen (CN); Chuangfeng Chen, Shenzhen (CN); Sixin Gu, Shenzhen (CN); Hongqiang Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/987,139

(22) Filed: Nov. 15, 2022

(65) Prior Publication Data

US 2023/0071779 A1 Mar. 9, 2023

Related U.S. Application Data

(63) Continuation of application No. PCT/CN2022/071561, filed on Jan. 12, 2022.

(30) Foreign Application Priority Data

Jan. 18, 2021 (CN) .......................... 202110063001.0

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC ........................ G06F 16/9535; G06F 16/9538
See application file for complete search history.

(56) References Cited

U.S. PATENT DOCUMENTS 6,631,496 B1 * 10/2003 Li ........................ G06F 16/9562
707/999.102
6,684,399 B1 * 1/2004 Grooters ................ H04N 7/165
348/E7.063

(Continued)

FOREIGN PATENT DOCUMENTS

CN 103092857 A 5/2013
CN 105373570 A 3/2016

(Continued)

OTHER PUBLICATIONS

International Search Report of PCT/CN2022/071561 dated Mar. 17, 2022 [PCT/ISA/210].

(Continued)

*Primary Examiner* — Jensen Hu
(74) *Attorney, Agent, or Firm* — Sughrue Mion, PLLC

(57) ABSTRACT

Processing historical browsing content with an electronic device which can generate a first user operation page of a target application; in response to a historical reference operation triggered via the first user operation page, generate a browsing record page including a historical content area, one historical content area corresponding to one content type, and each historical content area including first content description information; and in response to a presenting operation for first content description information selected (Continued)

Generate a first user operation page of a target application — 101

In response to a historical reference operation triggered via the first user operation page, generate a browsing record page, the browsing record page including at least one historical content area, one historical content area corresponding to one content type, and each historical content area including at least one first content description information — 102

In response to a presenting operation for first content description information selected from the historical content area, generate target historical browsing content corresponding to the selected first content description information — 103 from the historical content area, generate target historical browsing content corresponding to the selected first content description information, and therefore the first content description information of the historical browsing content under each content type may be provided in a centralized mode through a browsing record page, so that content desired to be browsed again may be found in a short time, improving the search efficiency for the historical browsing content.

20 Claims, 10 Drawing Sheets

(56)                References Cited

U.S. PATENT DOCUMENTS

| | | | | |
|---|---|---|---|---|
| 9,747,057 | B1* | 8/2017 | Ramani | G06F 3/067 |
| 2006/0224583 | A1* | 10/2006 | Fikes | G06F 16/9535 |
| | | | | 707/E17.112 |
| 2007/0220441 | A1* | 9/2007 | Melton | G06F 16/955 |
| | | | | 715/781 |
| 2009/0178083 | A1 | 7/2009 | White et al. | |
| 2011/0191344 | A1* | 8/2011 | Jin | G06F 16/951 |
| | | | | 707/769 |
| 2013/0006952 | A1* | 1/2013 | Wong | G06F 16/9535 |
| | | | | 707/706 |
| 2014/0019534 | A1* | 1/2014 | Handrigan | G06F 16/00 |
| | | | | 709/204 |
| 2015/0039982 | A1* | 2/2015 | Bastide | G06F 16/9536 |
| | | | | 715/753 |
| 2016/0112829 | A1* | 4/2016 | Kalb | H04W 4/029 |
| | | | | 455/456.3 |
| 2018/0246983 | A1* | 8/2018 | Rathod | G06F 16/972 |
| 2021/0373728 | A1* | 12/2021 | Wagle | H04L 67/02 |

FOREIGN PATENT DOCUMENTS

| | | |
|---|---|---|
| CN | 107870784 A | 4/2018 |
| CN | 108416053 A | 8/2018 |
| CN | 110162353 A | 8/2019 |
| JP | 2007-89025 A | 4/2007 |
| JP | 2011-512701 A | 4/2011 |
| JP | 109902255 A | 6/2019 |
| KR | 10-2010-0101690 A | 9/2010 |

OTHER PUBLICATIONS

Written Opinion of PCT/CN2022/071561 dated Mar. 17, 2022 [PCT/ISA/237].

Office Action issued May 28, 2024 in Japanese Application No. 2023-524930.

Communication issued Jan. 2, 2025 in Korean Application No. 10-2023-7017115.

Communication issued Nov. 14, 2025 in CN Application No. 202110063001.0.

* cited by examiner

Figure 2E:
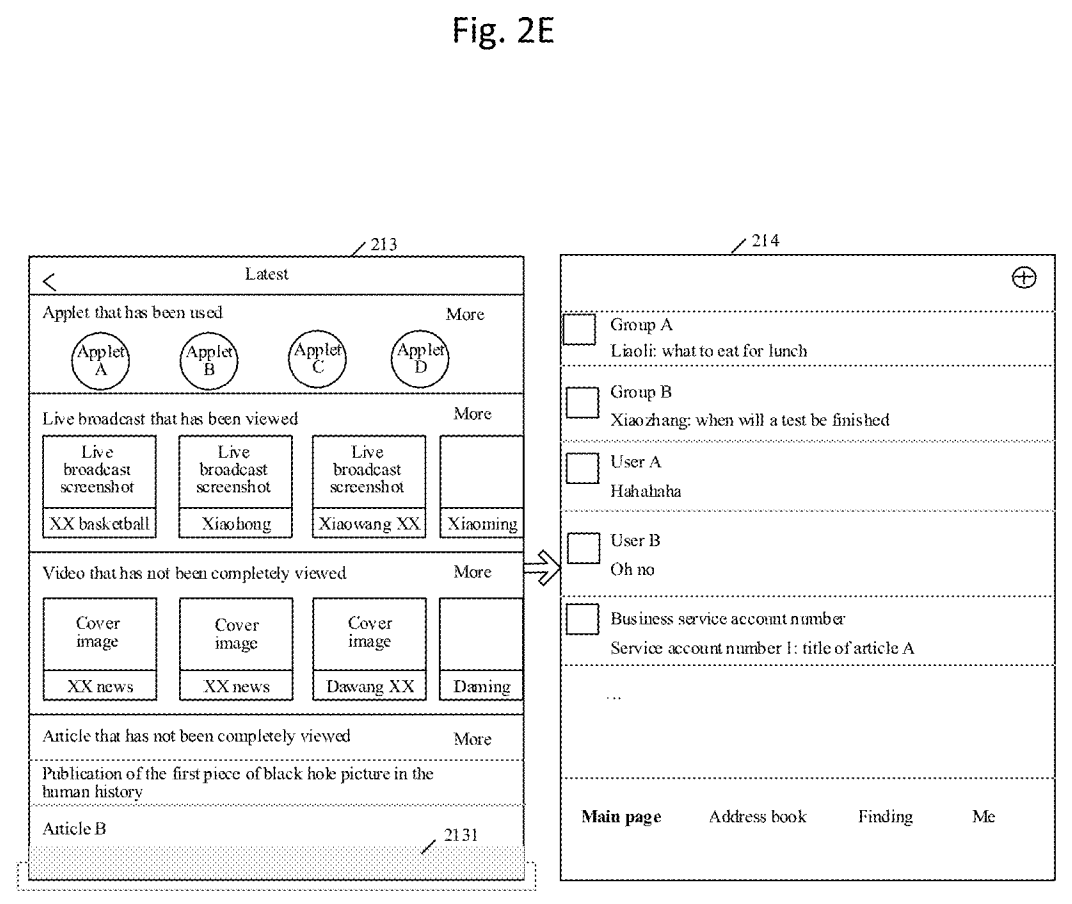

Latest

Applet that has been used　　　　　　More (Applet A)　(Applet B)　(Applet C)　(Applet D)

Live broadcast that has been viewed　　　　More

| Live broadcast screenshot | Live broadcast screenshot | Live broadcast screenshot | |
| XX basketball | Xiaohong | Xiaowang XX | Xiaoming |

Video that has not been completely viewed　　　More

| Cover image | Cover image | Cover image | |
| XX news | XX news | Dawang XX | Daming |

Article that has not been completely viewed　　　More

Publication of the first piece of black hole picture in the human history

Article B

/ 2131

/ 214

⊕

☐ Group A
　Liaoli: what to eat for lunch

☐ Group B
　Xiaozhang: when will a test be finished

☐ User A
　Hahahaha

☐ User B
　Oh no

☐ Business service account number
　Service account number 1: title of article A

⋮

Main page　　Address book　　Finding　　Me

Fig. 3

First operation page generating unit — 301

Browsing record page generating unit — 302

Content re-presenting unit — 303

METHOD AND APPARATUS FOR PROCESSING HISTORICAL BROWSING CONTENT ELECTRONIC DEVICE AND STORAGE MEDIUM

CROSS REFERENCE TO RELATED APPLICATION(S)

This application is a continuation of PCT/CN2022/071561 filed on Jan. 12, 2022 and claims priority to Chinese Patent Application No. 202110063001.0, entitled "METHOD AND APPARATUS FOR PROCESSING HISTORICAL BROWSING CONTENT ELECTRONIC DEVICE AND STORAGE MEDIUM", and filed with the Chinese Patent Office on Jan. 18, 2021, both of which are incorporated herein by reference in their entireties.

FIELD

The disclosure relates to the technical field of computers, and particularly, relates to a method and apparatus for processing historical browsing content, an electronic device and a storage medium.

BACKGROUND

More and more applications are now expanding the range of services available to users in order to increase their frequency of use of the application, and the content provisioning function is an important business for many applications. This content can be published on other platforms, shared by the users to the application, or published by the users in the application, and the user may sometimes want to view again this content. When there is such a need, the user often has to recall the actions they took before viewing the content and then perform them step by step. Obviously, this approach is not conducive to the user finding the content they want to view again quickly and is low in success rate in many cases.

SUMMARY

Embodiments of the disclosure provide a method and apparatus for processing historical browsing content, an electronic device and a storage medium, which can provide description information of the historical browsing content of a user in a centralized manner so as to quickly find the historical browsing content desired to be browsed, shorten the content search time and improve the search efficiency and success rate of the content.

Some embodiments of the disclosure provide a method for processing historical browsing content, applied to an electronic device, the method including:

generating a first user operation page of a target application;

in response to a historical reference operation triggered via the first user operation page, generating a browsing record page, the browsing record page including at least one historical content area, one historical content area corresponding to one content type, each historical content area including at least one first content description information, and one first content description information of one historical content area being used for describing one historical browsing content under the content type corresponding to the historical content area; and in response to a presenting operation for first content description information selected from the historical content area, generating target historical browsing content corresponding to the selected first content description information.

Some embodiments of the disclosure provide an apparatus for processing historical browsing content, applied to an electronic device, the apparatus including:

a first operation page generating unit, configured to generate a first user operation page of a target application;

a browsing record page generating unit, configured to, in response to a historical reference operation triggered via the first user operation page, generate a browsing record page, the browsing record page including at least one historical content area, one historical content area corresponding to one content type, each historical content area including at least one first content description information, and one first content description information of one historical content area being used for describing one historical browsing content under the content type corresponding to the historical content area; and a content re-presenting unit, configured to, in response to a presenting operation for first content description information selected from the historical content area, generate target historical browsing content corresponding to the selected first content description information.

In some embodiments of the disclosure, a storage medium is further provided, storing a computer program. The computer program, when executed by a processor, implements the operations of the foregoing method.

In some embodiments of the disclosure, an electronic device is further provided, including a memory, a processor, and a computer program stored on the memory and runnable on the processor. The processor, when executing the computer program, implements the operations of the foregoing method.

BRIEF DESCRIPTION OF THE DRAWINGS

To describe the technical solutions of example embodiments of the disclosure more clearly, the following briefly describes the accompanying drawings required for describing the example embodiments. The accompanying drawings in the following description show only some embodiments of the disclosure. Persons of ordinary skill in the art may still obtain other accompanying drawings according to these accompanying drawings without creative efforts. In addition, one of ordinary skill would understand that aspects of example embodiments may be combined together or implemented alone.

FIG. 2a is a schematic diagram of presenting historical browsing content provided by an example embodiment of the disclosure.

FIG. 2b is another schematic diagram of presenting historical browsing content provided by an example embodiment of the disclosure.

FIG. 2*d* is a schematic diagram of exiting a browsing record page provided by an example embodiment of the disclosure.

FIG. 2*e* is a schematic diagram of adjusting first content description information displayed in a historical content area by a sliding operation in the historical content area of a browsing record page provided by an example embodiment of the disclosure.

FIG. 3 is a schematic structural diagram of an apparatus for processing historical browsing content provided by an example embodiment of the disclosure.

DESCRIPTION OF EMBODIMENTS

The technical solutions in example embodiments of the disclosure are clearly and completely described in the following with reference to the accompanying drawings in the embodiments of the disclosure. The described example embodiments are merely some rather than all of the embodiments of the disclosure. All other embodiments obtained by persons of skill in the art based on the example embodiments of the disclosure without creative efforts shall fall within the protection scope of the disclosure.

Embodiments of the disclosure provide a method and apparatus for processing historical browsing content, an electronic device and a storage medium.

Specifically, the electronic device of some embodiments of the disclosure may be a terminal, and the terminal may include a mobile terminal and a fixed terminal. The mobile terminal includes, but is not limited to, a smart phone, a smart watch, a tablet computer, a notebook computer, a smart vehicle-mounted device, etc., where the fixed terminal includes, but is not limited to, a desktop computer, a smart television, etc.

The electronic device of some embodiments of the disclosure may further be a server. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content distribute network (CDN for short), big data, and an AI platform, but this is not limited thereto.

Figure 1A:
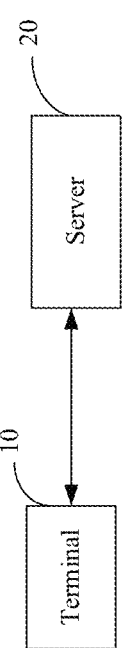
FIG. 1a is a schematic structural diagram of a system for processing historical browsing content provided by an example embodiment of the disclosure.

Referring to FIG. 1*a*, a system for processing historical browsing content provided by some embodiments includes a terminal 10, a server 20 and the like. The terminal 10 and the server 20 are connected through a network, such as a wired or a wireless network connection.

The terminal 10 may be configured to generate a first user operation page of a target application; and in response to a historical reference operation triggered via the first user operation page, generate a browsing record page. The browsing record page includes at least one historical content area. One historical content area corresponds to one content type. Each historical content area includes at least one first content description information. One first content description information of one historical content area is used for describing one historical browsing content under the content type corresponding to the historical content area. The historical browsing content is content that has been browsed within a historical time period in the target application. The terminal 10 may also, in response to a presenting operation for selected first content description information, generate target historical browsing content corresponding to the selected first content description information.

For example, the terminal 10, in response to the historical reference operation triggered via the first user operation page, obtains the first content description information from the server.

Specifically, the terminal 10, in response to the historical reference operation triggered via the first user operation page, may generate a historical browsing content acquisition request, and send the request to the server 20. After receiving the historical browsing content acquisition request, the server 20 may acquire first content description information of the historical browsing content of a user under each content type based on a user identification in the request, and send the first content description information to the terminal 10. When the server sends the first content description information, a type identification of the content type corresponding to the first content description information may be sent together to the terminal 10 so that the terminal 10 can identify the content type corresponding to the first content description information.

Detailed descriptions are respectively provided below. It should be noted that a description order of the following embodiments is not construed as a limitation on a preferred order of the example embodiments.

Figure 1B:
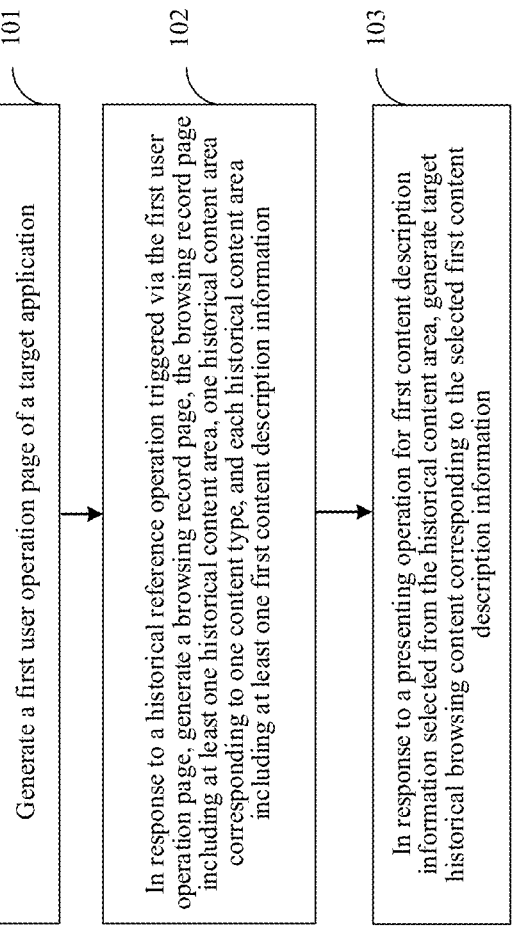
FIG. 1B is a flowchart of a method for processing historical browsing content provided by an example embodiment of the disclosure.

Some embodiments of the disclosure provide a method for processing historical browsing content, and the method may be executed by an electronic device, for example, by a processor of a terminal, and may also be executed by a processor of a terminal and a processor of a server together; and as shown in FIG. 1B, the flow of the method for processing historical browsing content may be as follows:

101: Generate a first user operation page of a target application.

The target application of some embodiments may be any type of application. For example, the type of the target application can include: a financial type, a game type, a social type, etc. In one example, the target application may have an instant messaging function and the target application may be an instant messaging client.

In some embodiments, a user who currently logs in the target application is referred to as a current user of the target application, and the first user operation page may be any user operation page in the target application, which is not limited in some embodiment.

The first user operation page may be a page generated and displayed after the current user logs in the target application. For example, "generate the first user operation page of the target application" may include:

display an application icon page of the terminal, the application icon page including an application icon of at least one application, where the application includes a target application; and in response to a click/tap operation for the application icon of the target application, generate the first user operation page of the target application.

Alternatively, the first user operation page may be switched from other operation pages of the target application, and in one example, "generate the first user operation page of the target application" may include:

generate a third user operation page, the third user operation page including a switching control of the first user operation page; and in response to a triggering operation for the switching control of the first user operation page, generate the first user operation page.

Functions and provided content of the third user operation page are not limited by the example embodiment of the disclosure.

The first user operation page may be a session list page of the target application, and the session list page includes a session flow of the current user of the target application; the session flow includes session messages of the current user and associated users, and may also include account number information of a business service account number, etc.

Alternatively, the first user operation page may be a function list page of the target application, the function list page including at least one function control, for example, a search function control providing the user with an image search function, an interaction function control providing the user with a function for interaction with nearby persons, etc.

102: In response to a historical reference operation triggered via the first user operation page, generate a browsing record page. The browsing record page includes at least one historical content area, one historical content area corresponds to one content type, and each historical content area includes at least one first content description information. One first content description information of one historical content area is used for describing one historical browsing content under the content type corresponding to the historical content area. The historical browsing content is content that has been browsed within a historical time period in the target application.

In some embodiments, from the perspective of the current user, the historical browsing content may be content that the current user of the target application has browsed through the target application within the historical time period.

The historical browsing content may be content directly presented through the target application. For example, the historical browsing content may include content provided by the target application, pictures received through the target application, etc. Such content may be displayed without calling a third-party application.

The historical browsing content can also be content provided by other platforms (platforms other than the target application) such as a video application, an audio application, a shared document application, a third-party live broadcast application, link information of content of other platforms may be presented in a page of the instant messaging client in a manner allowed by the target application to be used for the user, and after the user clicks/taps these links, content displayed corresponding to the link is the historical browsing content of the user.

A shared document is a document that may be operated simultaneously or non-simultaneously by at least two authorized users.

In some embodiments, the content type may include all content types allowed to be displayed by the target application, but it may be understood that some content types are not used by some users according to the interests or requirements of different users, and for example, for middle-aged and elderly users, content such as the shared document is generally rarely used; and in order to reduce unnecessary resource waste caused by setting the historical content area for all the content types, the content type corresponding to the historical content area in operation 202 may be understood as the content type to which the historical browsing content belongs within the historical time period. That is, if there is no historical browsing content under a certain content type within the historical time period, the historical content area of the content type will not appear in the browsing record page.

The content type includes, but is not limited to: a sub-program of the target application, live broadcast, video, audio, a document, an article, etc.

Content under the document type may include: a word document, a PDF document, a shared document, an excel document, a notebook document, etc. Content under the article type may include an article published on the Internet by any user, any platform, etc., without limiting the subject matter, author, etc. of the article.

The historical time period may be understood as a time period from a current moment to a historical moment, and the duration of the time period may be set as needed, for example, 1 h, 2 h, 30 min, etc.

The first content description information is information for describing the historical browsing content, so that the user may quickly know what the historical browsing content is, and what role the historical browsing content may play, and the user may quickly choose whether to browse the content again. In one example, the first content description information may include the name, author, picture (article illustration, video screenshot, etc.), etc. of the historical browsing content.

For the sub-program, the first content description information may include a name and/or an application icon of the sub-program.

For the live broadcast and the video, the first content description information may include images within the video, and information of the producer of the video (or the account number from which the video is published).

For the audio, the first content description information may include information about the name and author of the audio.

For the article and the document, the first content description information may include information about the name, author, data size (of the article or document), etc.

In one example, the first user operation page is a session list page, and the operation "in response to a historical reference operation triggered via the first user operation page, generate a browsing record page" may include:

in response to a pull-down operation for the session list page, generate the browsing record page.

Figure 2A:
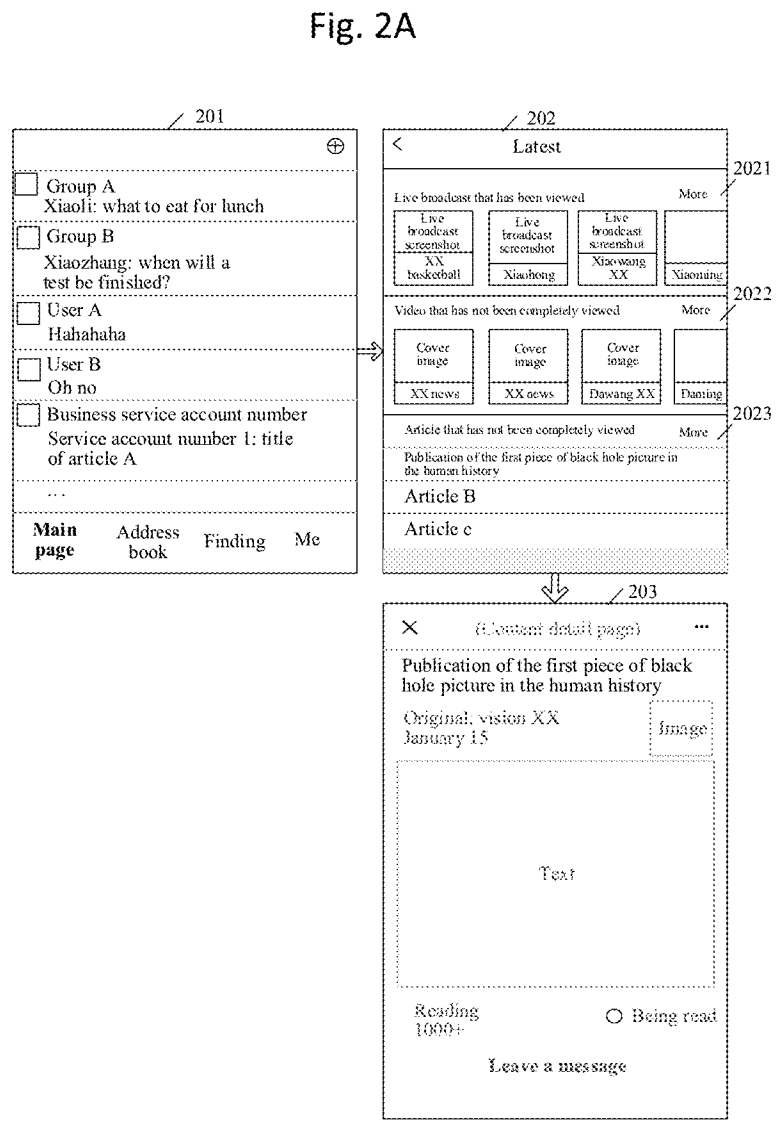

For example, referring to FIG. 2*a*, a page 201 in FIG. 2*a* is the session list page, and the page includes a session message of a group where the current user is located, a session message of the current user and associated users (such as user A and user B), a message of a business service account number of the current user, etc. If a triggering operation of the user for the session message is detected, a group chat session page of the group or a single chat session page with the associated user is generated. If a triggering operation of the user for the message of the business service account number is detected, a message page of the business service account number, the message page including business service information published under the business service account number is generated. The business service information may include various articles, videos, documents, audio, etc.

When it is detected that the user performs the pull-down operation in the page indicated by 201, a browsing record page indicated by 202 is generated, the browsing record page including at least 3 historical content areas 2021-2023, respectively corresponding to three content types of live broadcast, video and articles. First content description information of at least one historical browsing content is displayed in each historical content area.

In some embodiments, a position arrangement method of the first content description information in different historical content areas may be determined according to the type of specific content of the first content description information, for example, referring to the page 202, the first content description information may be arranged horizontally in the historical content area for the type of live broadcast, video, and the like, and the first content description information may be arranged vertically in the historical content area for the type of articles, documents, and the like, which is not limited by some embodiments.

In one example, generation and display of the browsing record page may also be triggered via a specific control. For example, the first user operation page includes a first content viewing control (which may also be referred to as a historical content viewing control). The operation "in response to a historical reference operation triggered via the first user operation page, generate a browsing record page" may include:

in response to a viewing operation for the first content viewing control, generate the browsing record page.

For example, the first user operation page may be a function list page described above, and the first content viewing control is one function control in the function list page.

Figure 2B:
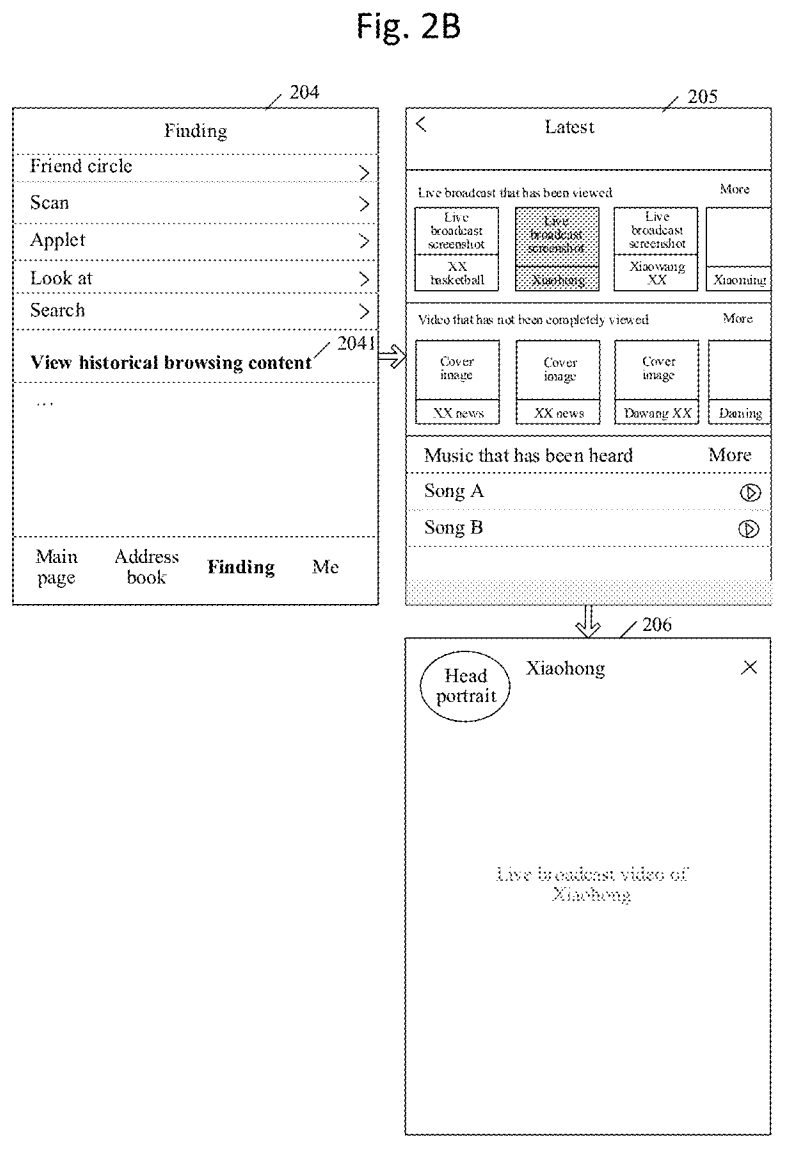

For example, referring to FIG. 2b, a page indicated by 204 in FIG. 2b is the function list page, and includes a function control list, for example, a "friend circle" control which can provide an interaction page, a "sweeping" control which can call a code graph scanning function, a "sub-program" control which can provide a sub-gram, and a first content viewing control 2041 named as "viewing historical browsing content" are included in the list; and in response to a triggering operation, such as a click/tap, a double-click/tap, a long-press and other touch control operations, for the control 2041, a browsing record page 205 is generated.

The interaction page may include interaction information published by the current user and his/her associated users.

103: In response to a presenting operation for first content description information (also referred to as target first content description information) selected from the historical content area, generate target historical browsing content corresponding to the selected first content description information.

In one example, the first content description information includes link information corresponding to the historical browsing content. When the target historical browsing content corresponding to the selected first content description information is generated, the corresponding target historical browsing content may be generated and presented through the link information.

In one example, when the target historical browsing content is generated and presented, the browsing record page may not be switched to another page, for example, if the target historical browsing content is audio provided by the target application, presenting the target historical browsing content may include provide a presenting sub-page of the target historical browsing content, and the target historical browsing content is played through the presenting sub-page. The presenting sub-page includes an audio controlling control of the target historical browsing content, and the audio controlling control includes a volume adjustment control, a play progress adjustment control, etc.

In one example, presentation of the target historical browsing content needs to call a new page. For example, in response to the presenting operation for the selected first content description information, generate the target historical browsing content corresponding to the selected first content description information, may include:

in response to the presenting operation for the selected first content description information, generate a target content presenting page; and present the target historical browsing content corresponding to the target first content description information through the target content presenting page.

In one example, link information of the target historical browsing content comes from a second application, and in response to the presenting operation for the selected first content description information, generate the target content presenting page may include: in response to the presenting operation for the selected first content description information, access a server of the second application through the link information of the selected first content description information to acquire the target content presenting page and the target historical browsing content from the server.

For example, the target content presenting page may be a play page such as a video application. Specifically, in response to the presenting operation for the selected first content description information, generate the target content presenting page may include: in response to the presenting operation for the target first content description information, access link information linked by the target first content description information, acquire a target content presenting page and a video file corresponding to the link information, and play the video file in the target content presenting page.

For example, referring to FIG. 2a, in the browsing record page indicated by 202, when a viewing operation for first content description information "publication of the first piece of black hole photo in the human history" for a target article in an area 2023 is detected, an article detail page indicated by 203 is generated, and the article detail page is an article detail page of a target article, and includes detail information of the target article, such as a title, an author, a publication date, text, reading amount identification information, an interaction area, and other information. The reading amount identification information can identify the number of times at which the target article is read, and the interaction area may be used for presenting interaction information of users reading the target article, and for the current user to publish interaction information about the target article.

For another example, referring to FIG. 2b, in the browsing record page indicated by 205, when a presenting operation for first content description information of a live broadcast of a user "Xiaohong" under a live broadcast type is detected, a live broadcast page indicated by 206 is generated, the live broadcast page being a live broadcast page of the user "Xiaohong", and the live broadcast page including information about current live broadcast content of the user "Xiaohong", a head portrait and a name of the user "Xiaohong", etc.

It may be understood that the layout of the browsing record page is limited, the historical content area displayed more forward is generally seen by a user earlier, and considering that content with a higher user preference degree is easier to be repeatedly browsed by the user. In some embodiments, a presenting position of the historical content area in the browsing record page is determined based on the user preference degree of the content type corresponding to the historical content area, where the higher the user preference degree of the content type, the more forward the presenting position of the historical content area corresponding to the content type in the browsing record page.

The user preference degree may be determined according to the browsing frequency, interaction frequency, etc. of the user for the content under each content type in the target application in the historical use process, and the higher the browsing frequency, the higher the interaction frequency, then the higher the user preference degree, where the user preference degree may be determined by the terminal and can also be determined by the server, which is not limited by some embodiments. In other words, in the process of generating the browsing record page, the presenting position of the historical content area in the browsing record page is determined based on the user preference degree of the content type corresponding to the historical content area.

The user preference degree may also be obtained by performing statistics on the historical browsing content browsed by the user during the historical time period. For example, the terminal or the server can acquire the total number of the historical browsing content browsed by the user under each content type, the total browsing duration of the historical browsing content under each content type and the total number of the interaction information for the historical browsing content under each content type during the historical time period, and determine the user preference degree of the content type based on the total number of the historical browsing content, the total browsing duration and the total number of the interaction information under the same content type.

Considering that the longer the latest browsing time of the historical browsing content from the current moment, the lower the browsing possibility of the user, the position arrangement order of the first content description information in the same historical content area may be determined based on a time interval between the latest browsing time of the historical browsing content corresponding to the first content description information and the current moment. In other words, in the process of generating the browsing record page, the position arrangement order of the first content description information in the same historical content area is determined based on the time interval between the latest browsing time of the historical browsing content corresponding to the first content description information and the current moment. The smaller the time interval between the latest browsing time of the historical browsing content and the current moment, the more forward the position arrangement order of the first content description information corresponding to the historical browsing content in the historical content area.

When there is more historical browsing content, the historical content area cannot display the first content description information of all the historical browsing content, in order to facilitate that the user searches for the historical browsing content, each historical content area in some embodiments further includes a corresponding second content viewing control, and the method of some embodiments may further include:

in response to a triggering operation for the second content viewing control in a selected historical content area, display a content viewing page of a target content type corresponding to the selected historical content area, the content viewing page including second content description information of at least one historical browsing content under the target content type; and in response to a presenting operation for the selected second content description information, present historical browsing content corresponding to the selected second content description information.

The action of the second content description information is the same as that of the first content description information. The second content description information is used for describing the historical browsing content. In one example, the second content description information may be the first content description information. Alternatively, the second content description information may be richer than the first content description information in view of a larger presenting area of the content viewing page. For example, the second content description information may include some other information in addition to the first content description information, e.g. information such as a content presenting position of the historical browsing content when latest browsing of the historical browsing content by the user ends.

Figure 2C:
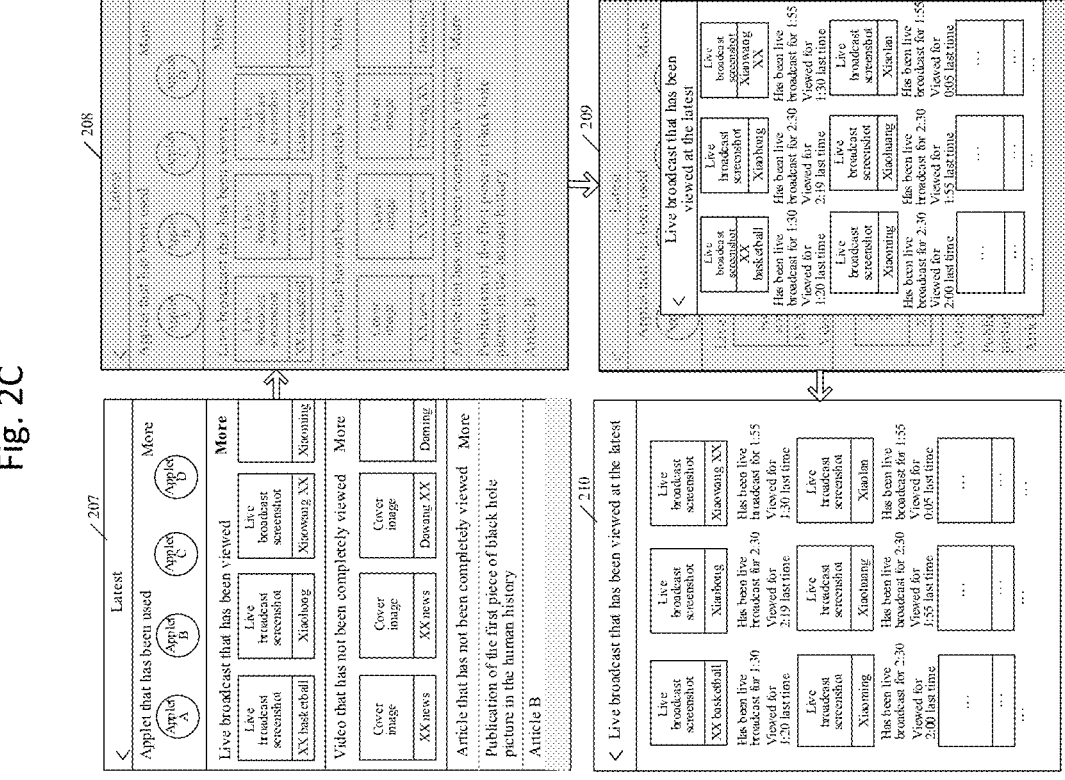
FIG. 2c is a schematic diagram of displaying a content viewing page of historical browsing content under a live broadcast type provided by an example embodiment of the disclosure.

For example, referring to FIG. 2c, a page indicated by 207 is a browsing record page, and in response to a triggering operation for a second content viewing control named as "more" in a live broadcast area in the browsing record page, a content viewing page indicated by 210 is finally displayed, the content viewing page including second content description information of at least one live broadcast content, and referring to the page 210, a current live broadcast duration, and a duration of live broadcast when the user finished viewing the live broadcast last time, and other information are added in the second content description information compared with the first content description information.

In one example, the content viewing page may be displayed by switching directly or by gradually sliding out on the right side.

In one example embodiment, the operation "in response to a triggering operation for a second content viewing control in a selected historical content area, generate a content viewing page of a target content type corresponding to the selected historical content area" may include:

in response to the triggering operation for the second content viewing control in the selected historical content area, adjust the browsing record page to a semi-transparent state;

generate the content viewing page in a reduced state on the right side of a screen, the content viewing page being a content viewing page of the target content type corresponding to the selected historical content area; and gradually increase the display size of the content viewing page until the content viewing page covers the browsing record page.

For example, referring to FIG. 2c, after the user clicks/taps the first content description information of the live broadcast of "Xiaohong", the browsing record page, shown as 208, changes into the semi-transparent state, and at a page 209, the content viewing page in the reduced state pops up from the right side of the screen and gradually increases until the browsing record page is covered, and a completely displayed content viewing page indicated by 210 is obtained.

In one example, the content in the historical content area may be switched to be displayed by a sliding operation. The method may further include:

in response to the sliding operation for the historical content area, adjust the first historical content description information displayed in the historical content area based on a sliding direction of the sliding operation.

Figure 2D:
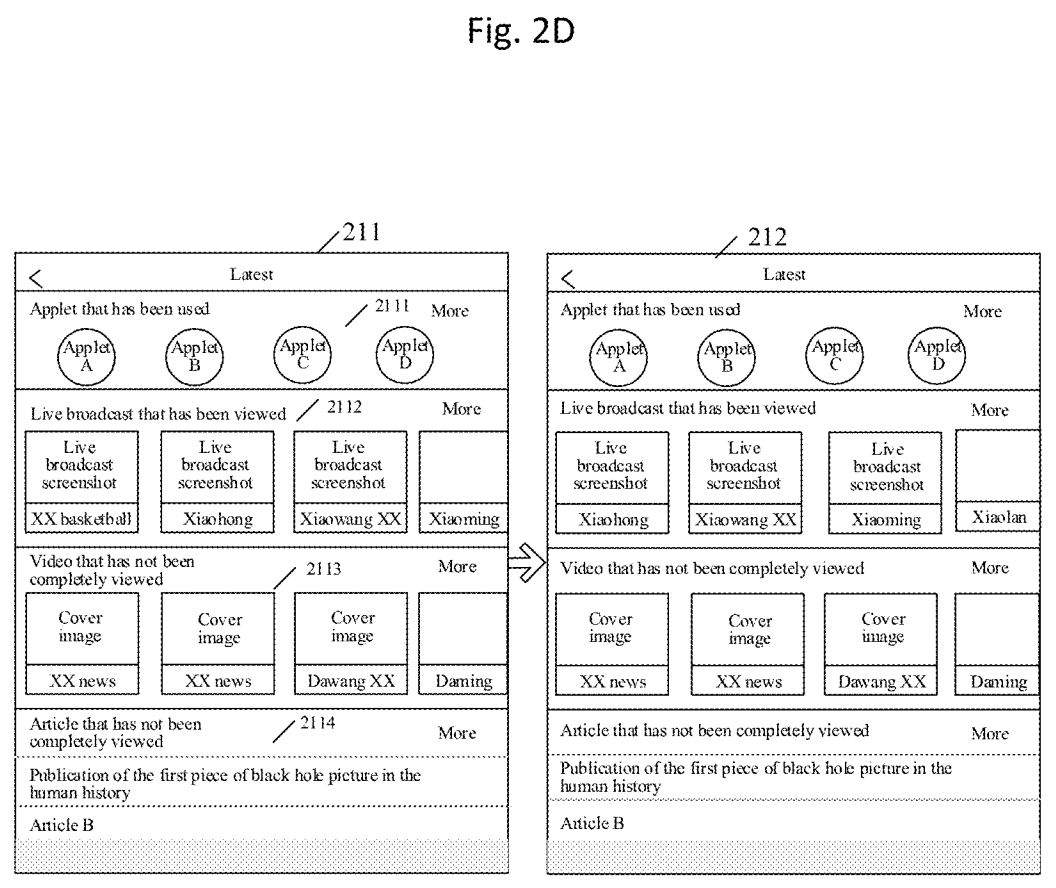

For example, referring to FIG. 2d, in a browsing record page indicated by 211, when a leftward sliding operation for a historical content area 2112 is detected, the first content description information in the area 2112 is also adjusted by sliding leftward, first content description information of a live broadcast of the leftmost XX basketball slides out of the historical content area, and first content description information of a live broadcast of "Xiaoming" and a part of first content description information of a live broadcast of "Xiaolan" in the historical content area slide into the historical content area for display.

In some embodiments, the browsing record page further includes a page return area, the page return area may be set at any position in the browsing record page, for example, may be set at the bottom of the browsing record page, namely, a position close to a lower frame of the screen, where the page return area may be identified with area identification information, and the area identification information includes, but is not limited to a color, a shadow, etc.

The first user operation page may be returned from the browsing record page, for example, by operating the page return area. The method of some embodiments may further include: in response to a return operation for the page return area in the browsing record page, switch for display of the first user operation page. The return operation includes, but is not limited to a click/tap, a double-click/tap, a long press, a finger joint click/tap, and other operations.

For example, referring to FIG. 2e, a page indicated by 213 is a browsing record page, a light gray area indicated by 2131 is the page return area, and when the return operation such as a click/tap operation for the page return area is detected, a session list page indicated by 214 is displayed.

In one example, an embodiment of the disclosure may also delete the first content description information in the historical content area. The method of the example embodiment of the disclosure may further include:

in response to a deleting operation for first content description information, delete the first content description information corresponding to the deleting operation from a historical content area.

The deleting operation may be a specific touch control operation, or formed by combining several specific touch control operations, or may be implemented by means of a control, which is not limited by some embodiments.

The specific touch control operation includes a double-click/tap, a long press, and other operations, the operation formed by combining several specific touch control operations includes a movement after a long press and other operations, and the deleting operation is not limited by some embodiments.

In one example, the operation "in response to a deleting operation for first content description information, delete the first content description information corresponding to the deleting operation from a historical content area" may include:

in response to an information management operation for the first content description information, generate a content operation control list of the first content description information, the content operation control list including at least one content operation control, and the content operation control including a deletion control; and in response to a triggering operation for the deletion control, delete the first content description information from the corresponding historical content area.

Figure 2F:
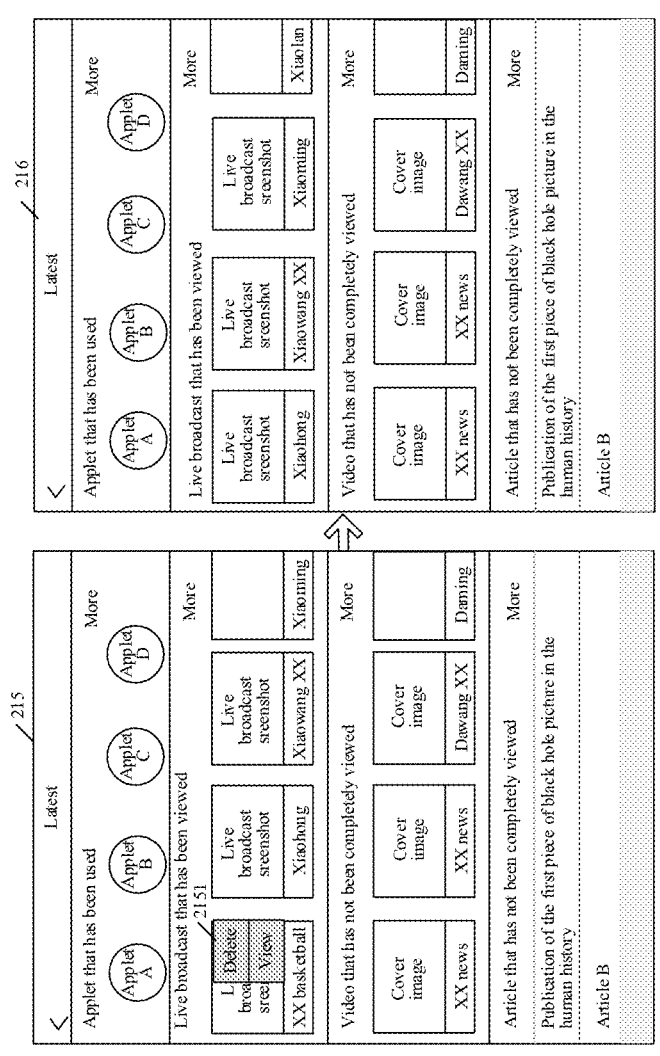
FIG. 2*f* is a schematic diagram of deleting first content description information in a historical content area provided by an example embodiment of the disclosure.

For example, referring to FIG. 2f, when an information management operation, such as a long press operation, for first content description information of a live broadcast of an "XX basketball" user is detected in a browsing record page indicated by 215, a content operation control list indicated by 2151 is generated, the list includes a content operation control, such as a deletion control, and when a triggering operation for the deletion control by the user is detected, the first content description information of live broadcast content of the "XX basketball" user is deleted, and the browsing record page indicated by 215 is updated to a browsing record page indicated by 216.

In one example, considering that the user generally rarely browses content that has been completely browsed, in order to further improve the accuracy of historical browsing content provided by the browsing record page, the historical browsing content in some embodiments includes content that has been browsed and has not been completely browsed within the historical time period in the target application.

Of course, it may be understood that, for content under some content types, a page to which the content corresponds may jump indefinitely, so that there is no concept that browsing ends, and taking a sub-program, etc. as an example, all sub-programs browsed by the current user are historical browsing content. However, for content in other content types, information that may be presented is limited and has a browsing end position, and for this content type, historical browsing content may be content that has not been completely browsed by the user.

In some embodiments, the browsing end position refers to a position of information, finally displayed when browsing of content ends, in the content.

Considering that when a user repeatedly browses content which has been previously browsed, it is easy to reduce the user experience, in order to improve the user experience and avoid wasting user time, the operation "in response to a presenting operation for selected first content description information, generate target historical browsing content corresponding to the selected first content description information" may include:

in response to a presenting operation for the selected first content description information, acquire a latest content presenting position of the target historical browsing content corresponding to the selected first content description information, the latest content presenting position being a user browsing progress position when latest presenting of the target historical browsing content ends; and generate the target historical browsing content, and start to present the target historical browsing content from the latest content presenting position of the target historical browsing content.

The terminal may locally store the latest content presenting position corresponding to the first content description information, and in response to the presenting operation for the target first content description information, can locally acquire the latest content presenting position corresponding to the first content description information.

Alternatively, the latest content presenting position corresponding to the first content description information may be acquired by the terminal from the server. For example, in response to the presenting operation for the selected first content description information, the latest content presenting position of the historical browsing content to which the selected first content description information corresponds may be requested from the server based on the selected first content description information.

For the content type of the sub-program which does not have the concept "browsing ends", in response to the presenting operation for the selected first content description information, the operation "acquire the latest content presenting position of the target historical browsing content corresponding to the selected first content description information" may not be executed, but the sub-program is called through a calling interface of the sub-program to generate an application page of the sub-program.

For content in a live broadcast type, in response to the presenting operation for the selected first content description information, the operation "acquire the latest content presenting position of the target historical browsing content corresponding to the selected first content description information" may not be executed, but a real-time live broadcast page is directly generated according to link information of the selected first content description information.

In some embodiments, in order to facilitate generation of a browsing record page, a corresponding historical browsing content set may be set for each user of the target application, each content type browsed by the user respectively corresponds to one historical browsing content set, and each historical browsing content set includes at least one first content description information of the historical browsing content under the corresponding content type. The terminal and/or the server can store a corresponding historical browsing content set of the user.

In some embodiments, the operation "in response to a historical reference operation triggered via the first user operation page, generate a browsing record page" may include:

in response to the historical reference operation for the first user operation page, acquire a historical browsing content set corresponding to each content type via the server, each historical browsing content set including at least one first content description information; and based on the first content description information in the historical browsing content set under each content type, generate the browsing record page and display the browsing record page.

In some embodiments, the historical browsing content set corresponding to each content type may be read locally from the terminal.

In some embodiments, the historical browsing content set of the current user may also be acquired from the server, and the operation "in response to the historical reference operation for the first user operation page, acquire a historical browsing content set corresponding to each content type via the server" may include:

in response to the historical reference operation for the user operation page, send a set acquisition request to the server, the request including a user identification of the current user; and receive the historical browsing content set, corresponding to each content type of the current user, sent by the server based on the user identification.

The user identification may include a terminal identification of the terminal, account information about the user on the target application, etc.

Each historical browsing content set may further include a representing parameter of a user preference degree of a corresponding content type, and the representing parameter of the user preference degree may represent the preference degree of the current user for content under the content type.

Accordingly, the operation "based on the first content description information in the historical browsing content set under each content type, generate the browsing record page and display the browsing record page" may include:

based on the representing parameter of the user preference degree in each historical browsing content set, determine the user preference degree of each content type;

based on the order from high to low of the user preference degree of each content type, set the arrangement order of a presenting position of a historical content area corresponding to the content type on the browsing record page; and according to the historical content area and the historical browsing content in the historical browsing content set under each content type, generate the browsing record page and display the browsing record page.

It is conceivable that the size of the historical content area is limited, and in order to avoid that the size of the first content description information is too small to facilitate user browsing, the number of the historical browsing content displayed simultaneously in the historical content area is also limited, and the closer the browsing end time of the historical browsing content to the current moment, the greater the possibility of browsing again by the user. So in some embodiments, when the browsing record page is displayed, the first content description information may be arranged in the historical content area in an order that a time interval between latest browsing time of the historical browsing content and the current moment becomes longer and longer.

The latest browsing time may be a browsing end time of latest browsing of the historical browsing content by the user.

The latest browsing time may be acquired from the server in real time based on the first content description information when the target historical browsing content needs to be played, and can also be acquired from the server while acquiring the first content description information. In some embodiments, in the historical browsing content set, corresponding to each content type of the current user, sent by the server based on the user identification, in addition to the first content description information and the representing parameter of the user preference degree, the current browsing time of the current user for the historical browsing content corresponding to the first content description information can also be included.

Considering that there is a possibility that the link information corresponding to the first content description information will fail with the lapse of time, for example, the historical browsing content is deleted, a live broadcast ends, in order to avoid that non-existing historical browsing content wastes user's time, in some embodiments, the validity of the link information corresponding to the first content description information may be verified before the browsing record page is generated.

In some embodiments, before the operation "based on first content description information in a historical browsing content set under each content type, generate the browsing record page and display the browsing record page", the example embodiment of the disclosure may further include:

detect the validity of the link information of the first content description information, and determine invalid link information in the link information based on a detection result; and delete the first content description information corresponding to the invalid link information from the historical browsing content set.

Validity detection of the link information can use any relevant link validity detection scheme, which is not limited by some embodiments.

The validity of the first content description information may also be detected by the server before sending the first content description information by the server, which is not limited by some embodiments.

In one example, the content description information included in the historical browsing content set may be second content description information, and when the browsing record page needs to be generated and displayed, the first content description information may be acquired from the second content description information of the historical browsing content set so as to generate and display the browsing record page.

For content of a live broadcast type, when a live broadcast corresponding to the link information ends, the link information may be considered to be invalid. In one example, when the live broadcast ends and the user does not completely browse the live broadcast content, live broadcast video may be taken as video that has not been completely browsed, for example, the server can take a live broadcast playback video which has not been completely browsed by the current user (the live broadcast has ended) as video which has not been completely browsed by the user, and the second content description information of the video is generated and stored in the historical browsing content set corresponding to a video type.

As time progresses, the first (or second) content description information in the historical browsing content set is also updated, specifically, if the time interval from the latest browsing time corresponding to the first (or second) content description information in the historical browsing content set to the current moment is greater than the duration of the historical time period, the first (or second) content description information is deleted from the historical browsing content set.

Updating the historical browsing content set may be executed by the server or the terminal, which is not limited by this example embodiment.

After operation 103, it may further include that detect a current browsing position of the target historical browsing content, and if the current browsing position satisfies conditions of a browsing end position, determine that browsing of the target historical browsing content is completed, delete the first content description information of the target historical browsing content from the historical browsing content set local to the terminal, and delete the target first content description information from the historical content area.

In some embodiments, it is also possible to generate browsing end indication information, the indication information carrying a content identification of the target historical browsing content, such as a content name, and send a browsing end identification to the server so that the server updates the historical browsing content set.

A threshold of a display number of corresponding first content description information can also be set in each historical content area, and the maximum number of the first content description information displayed in different historical content areas may be different according to the difference of the position arrangement method of the first content description information in each historical content area and the style of displayed information, etc.; and in one example, the historical content area can only display first content description information of several historical browsing content with the latest browsing time closest to the current moment. It may be understood that when the first content description information of the historical browsing content is newly added to the set, the first content description information provided by the historical content area is updated accordingly.

In some embodiments, the features of the first (or second) content description information in the historical browsing content set are described:

(1) For Applets Used by the Current User

The historical browsing content set includes applets used by the current user within the historical time period.

The browsing record page provides, by default, a certain number of application icons of applets.

(2) For Live Broadcasts Viewed by the Current User

If the live broadcast viewed by the current user is not finished, the first content description information thereof is stored in the historical browsing content set.

In some embodiments, the threshold of the display number of the first content description information of the live broadcast content in the browsing record page may be set as desired, e.g. 3, 5, etc.

In order to avoid that the first content description information of the live broadcast with a very short user click/tap-on time also generates a browsing record page, consequently, the user's willingness to browse again is reduced, a shortest browsing duration can also be set, and for live broadcast video which the user has browsed and is broadcast live in real time, only if the continuous browsing duration of the user is not less than the shortest browsing duration, is the first content description information thereof stored in the historical browsing content set.

For example, the shortest browsing duration may be set by the user or the server, which is not limited by some embodiments, and may be set to 15 s, for example.

For the historical browsing content set corresponding to the live broadcast type, when the live broadcast ends, the server may delete the first content description information corresponding to live broadcast content that ends from the historical browsing content set.

Some embodiments of the disclosure may also execute following operation before the operation 101: generate a second user operation page of the target application, the second user operation page including at least one access entry for content under the content type;

in response to an access operation for a selected access entry, generate a content presenting page, and present target content corresponding to the selected access entry via the content presenting page;

in response to a browsing end operation for the content presenting page, close the content presenting page; and in a case that a continuous browsing duration of the presented target content is not less than a shortest browsing duration, acquire first content description information of the target content, and store the first content description information into a corresponding historical browsing content set.

In one example, the historical browsing content set corresponding to the live broadcast type may be provided with a highest threshold of live broadcast video, and when the amount of the first content description information exceeds the highest threshold, the first content description information may be deleted from the historical browsing content set in an order that the time interval between the latest browsing time and the current moment becomes longer and longer, until the amount of the first content description information is not greater than the highest threshold.

3) Video that has not been Completely Viewed

If the video which has been opened by a user through the target application is not completely viewed, the first content description information thereof will be stored in the corresponding historical browsing content set.

The shortest playing duration can also be set for a video type, and for video which has been opened by a user, if the duration during which the video has been played is not less than the shortest playing duration, then the first content description information thereof is stored in the historical browsing content set.

For example, the shortest playing duration may be set by the user or the server, which is not limited in some embodiments, and may be set to 15 s, for example. The advertisement duration in the video is not accumulated within the duration during which the video has been played, where if the user manually adjusts a progress bar, the duration during which the video has been played may be the actual playing duration of the video.

If in operation 103, the user clicks/taps the first content description information of a certain video, and after a video play page is displayed, if the video played on the video play page reaches a pre-set end position, it is determined that the user has finished browsing the video, and the terminal can delete the video from the historical browsing content.

The pre-set end position may be a pre-set end time point, or a position on the progress bar where the remaining duration of an unplayed video is less than a pre-set maximum remaining duration.

The threshold of the display number may be set by the server.

(4) Article that has not been Completely Viewed

A publication platform of the article is not limited, it may be another instant messaging client, and the article can appear in any position in the target application, for example, it may be displayed on a chat session page, it may be displayed in an interaction page, or it can also be displayed in an account number message page of a business service account number, which is not limited by some embodiments.

If the user has clicked/tapped on this official account article, the first content description information of this article is stored in the corresponding historical browsing content set if the article has not been viewed completely.

Positions of some elements in the article may be set as a browsing end position. For example, a specific control or a specific word in the article is set as the browsing end position.

In the process of browsing the article, if the browsing end position is not displayed in the page, the article is not browsed completely, for example, referring to FIG. 2a, the position of reading amount identification information, namely "reading 10000+", in the page 203 may be set as the browsing end position, and the terminal can monitor whether the reading amount identification appears in the display page of the article, if not, the article has not been browsed completely, otherwise, the article has been completely browsed by the user.

The latest content presenting position of the article may be identified by text displayed on the last line at the end of browsing.

(5) Document that has not been Completely Viewed

Similar to the article, during latest browsing of document content such as files, notes, etc. viewed by the user, positions of some elements in the document may be set as the browsing end position. For example, specific controls or specific words in the document are set as the browsing end position.

In the browsing process of the document, if the browsing end position is not displayed in the page, the document has not been browsed completely, otherwise, the document has been browsed completely.

(6) Music that has been Heard

For audio which is triggered to be played by the user via the target application, if the continuous playing duration exceeds the pre-set playing duration, the first content description information of the audio is stored in the historical browsing content set.

The pre-set playing duration is set as required, such as 10 s, which is not limited by this example embodiment.

The audio in the historical browsing content set may not be deleted in consideration of the cyclic playing scene of music.

In one example, the user may also mark important content through his own operations, and the terminal may store the marked content in the historical browsing content set for display on the browsing record page. The method in some embodiments may further include:

display a second user operation page of a target application, the second user operation page including an access entry for content under at least one content type;

in response to an access operation for a selected access entry, generate a content presenting page and present target content corresponding to the selected access entry via the content presenting page, where the content presenting page includes an important content marking control; and in response to a triggering operation for the important content marking control, acquire first content description information provided with an important content identification of the target content, and store the first content description information provided with the important content identification into a historical browsing content set under a corresponding content type.

The presenting form of the access entry includes, but is not limited to, a control, an icon linked with link information, text, etc.

The second user operation page may be the same as or different from the first user operation page, which is not limited by some embodiments.

In one example, the important content identification may also be set for the first content description information of the target content in response to the triggering operation for the important content marking control. The first content description information provided with the important content identification is stored in the historical browsing content set.

In some embodiments, in operation 102, the first content description information with the important content identification is arranged in a left-to-right or top-to-bottom order in the historical content area, and if there is a free position still in the historical content area after the first content description information with the important content identification is arranged, the first content description information without the important content identification is arranged in an order that the time interval between the latest browsing time and the current moment becomes longer and longer.

The validity period of the important content identification can also be set, and when the duration after the important content identification is set exceeds the validity period duration (such as 7 days), the first content description information corresponding to the important content identification is arranged according to the time interval between the latest browsing time thereof and the current moment, or the first content description information with the important content identification out of date is deleted from the historical browsing content set.

After in response to the access operation for the target access entry, display the content presenting page, the method may further include:

in response to a browsing end operation for the content presenting page, detect whether target content presented in the content presenting page reaches a pre-set browsing end position, and close the content presenting page; and if the presented target content does not reach the pre-set browsing end position, acquire first content description information, provided with the latest content display position, of the target content and store the first content description information provided with the latest content display position in a corresponding historical browsing content set.

Setting of the browsing end position can refer to the description of the foregoing example, and will not be described in detail herein.

When the presented target content reaches the pre-set browsing end position, it may be understood that information of the pre-set browsing end position in the target content has been presented (displayed or played, etc.).

For example, for audio and video, the pre-set browsing end position may be an end time point of the audio or video or a specific time point that is a pre-set duration from the end time point, where the pre-set duration may be arbitrarily set, such as 10 s. That is, when the audio is played to the last 10 seconds, it is determined that the audio reaches the pre-set browsing end position.

In some embodiments, first content description information of historical browsing content under each content type may be provided in a centralized mode by the browsing record page. In view of centralized providing of the first content description information, description information of the content which the user wants to browse again may be determined from the first content description information, and then presentation of the target historical browsing content is triggered based on a presenting operation. Compared with a solution in the related art in which the user needs to constantly recall a browsing path of the historical browsing content, and then retrieves the content from a group chat page, an interaction page, etc. via a series of click/tap operations, etc., long-term recall is not required, the time required for re-presenting the target historical browsing content may be effectively shortened and the search efficiency of the historical browsing content is improved.

In order to better implement the above method, accordingly, the embodiment of the disclosure further provides an apparatus for presenting historical browsing content, which may be applied to an electronic device. For example, the apparatus may be specifically integrated into the electronic device such as a terminal.

Figure 3:
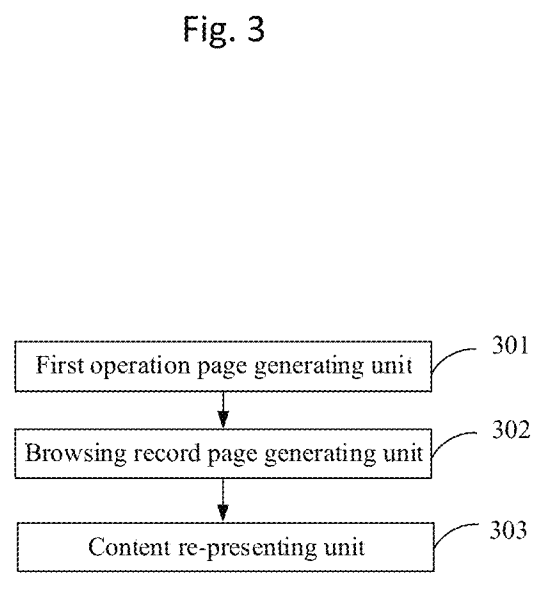

Referring to FIG. 3, the apparatus for presenting the historical browsing content includes:

a first operation page generating unit 301, configured to generate a first user operation page of a target application;

a browsing record page generating unit 302, configured to, in response to a historical reference operation triggered via the first user operation page, generate a browsing record page, the browsing record page including at least one historical content area, one historical content area corresponding to one content type, and each historical content area including at least one first content description information; and a content re-presenting unit 303, configured to, in response to a presenting operation for first content description information selected from the historical content area, generate target historical browsing content corresponding to the selected first content description information.

In one example, the historical browsing content is content that has been browsed within a historical time period in the target application. The first user operation page includes a session list page, the session list page including a session flow of a user of the target application.

The browsing record page generating unit, configured to, in response to a pull-down operation for the session list page, generate the browsing record page.

In one example, the first user operation page includes a first content viewing control; and the browsing record page generating unit, configured to, in response to a viewing operation for the first content viewing control, generate the browsing record page.

In one example, a presenting position of the historical content area in the browsing record page is determined based on the user preference degree of the content type corresponding to the historical content area, where the higher the user preference degree of the content type, the more forward the presenting position of the historical content area corresponding to the content type in the browsing record page.

In one example, the position arrangement order of the first content description information in the same historical content area is determined based on a time interval between latest browsing time of the historical browsing content corresponding to the first content description information and the current moment.

In one example, each historical content area further includes a corresponding second content viewing control, and the apparatus further includes:

a more-content presenting unit, configured to, in response to a triggering operation for the second content viewing control in a selected historical content area, generate a content viewing page of a target content type corresponding to the selected historical content area, the content viewing page including at least one second content description information under the target content type; and a second content re-presenting unit, configured to, in response to a presenting operation for selected second content description information, generate historical browsing content corresponding to the selected second content description information.

In one example, the historical browsing content includes content that has been browsed within the historical time period and has not been completely browsed in the target application.

In one example, a content re-presenting unit is configured to:

in response to a presenting operation for the selected first content description information, acquire a latest content presenting position of the target historical browsing content corresponding to the selected first content description information, the latest content presenting position being a user browsing progress position when latest presenting of the target historical browsing content ends; and generate the target historical browsing content, and present the target historical browsing content from the latest content presenting position of the target historical browsing content.

In one example, the apparatus further includes:

a record deleting unit, configured to, in response to a deleting operation for first content description information, delete the first content description information corresponding to the deleting operation from a historical content area.

In one example, the browsing record page generating unit is configured to:

in response to a historical reference operation for a first user operation page, acquire a historical browsing content set corresponding to each content type via a server, the history browsing content set including first content description information of the historical browsing content under the corresponding content type; and based on the first content description information in the historical browsing content set under each content type, generate a browsing record page and display the browsing record page.

In one example, the browsing record page generating unit is further configured to:

detect the validity of the link information of the first content description information, and determine invalid link information in the link information based on a detection result; and delete the first content description information corresponding to the invalid link information from the historical browsing content set.

In one example, the apparatus further includes:

a second operation page generating unit, configured to generate a second user operation page of a target application, the second user operation page including an access entry for content under at least one content type;

a content presenting unit, configured to, in response to an access operation for a selected access entry, generate a content presenting page and present target content corresponding to a target access entry via the content presenting page, where the content presenting page includes an important content marking control; and a marking unit, configured to, in response to a triggering operation for the important content marking control, acquire first content description information, provided with an important content identification, of the target content, and store the first content description information provided with the important content identification into a historical browsing content set under a corresponding content type.

With the apparatus of some embodiments, the first content description information of the historical browsing content under each content type may be provided in a centralized mode through the browsing record page, so that the user can find the content desired to be browsed again in a short time, effectively improving the search efficiency of the user for the historical browsing content.

Figure 4:
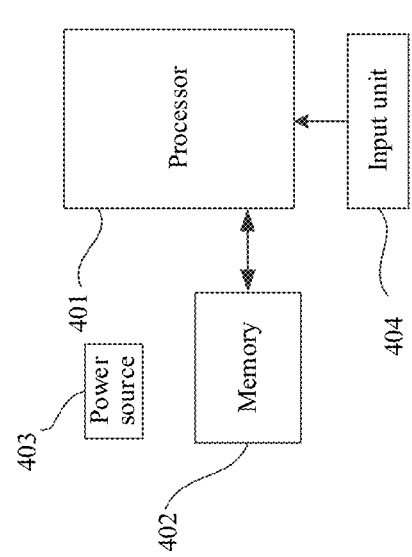
FIG. 4 is a schematic structural diagram of an electronic device provided by an example embodiment of the disclosure.

In addition, some embodiments of the disclosure further provides an electronic device. The electronic device may be a terminal or a server. As shown in FIG. 4, FIG. 4 is a schematic structural diagram of an electronic device according to some embodiments of the disclosure. Specifically, the electronic device may include components such as a processor 401 with one or more processing cores, a memory 402 with one or more computer-readable storage media, a power supply 403, an input unit 404 and the like. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. The processor 401 may include one or more processing cores. Preferably, the processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and a module. The processor 401 runs the software program and the module that are stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data created according to use of the electronic device. In addition, the memory 402 may include a high-speed random access memory, and may further include a nonvolatile memory, such as at least one magnetic disk storage device, a flash memory, or another volatile solid-state storage device. Correspondingly, the memory 402 may further include a memory controller, so that the processor 401 can access the memory 402.

The electronic device further includes the power supply 403 for supplying power to the components. Preferably, the power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other components.

The electronic device may further include the input unit 404. The input unit 404 may be configured to receive inputted digit or character information and generate a keyboard, mouse, joystick, optical, or trackball signal input related to user setting and function control.

Although not shown in the figure, the electronic device may further include a revealing unit and the like. Details are not described herein again. Specifically, in some embodiments, the processor 401 in the electronic device may load executable files corresponding to processes of one or more application programs to the memory 402 according to the following instructions, and the processor 401 runs the application program stored in the memory 402, so as to implement various functions as follows.

generating a first user operation page of a target application;

in response to a historical reference operation triggered via the first user operation page, generating a browsing record page, the browsing record page including at least one historical content area, one historical content area corresponding to one content type, each historical content area including at least one first content description information, and one first content description information of one historical content area being used for describing one historical browsing content under the content type corresponding to the historical content area; and in response to a presenting operation for first content description information selected from the historical content area, generating target historical browsing content corresponding to the selected first content description information.

For specific implementation of the foregoing operations, reference may be made to the foregoing embodiments, and details are not described herein again.

A person of ordinary skill in the art may understand that all or some operations of various methods in the foregoing embodiments may be implemented through instructions, or implemented through the instructions controlling relevant hardware, where the instructions may be stored in a computer-readable storage medium and loaded and executed by a processor.

Accordingly, some embodiments of the disclosure further provide a storage medium, storing a plurality of instructions. The instructions may be loaded by a processor, to perform the any barrage processing the method for processing historical browsing content provided in the embodiments of the disclosure.

The storage medium may include: a read only memory (ROM), a random access memory (RAM), a magnetic disk, an optical disc or the like.

Because the instructions stored in the storage medium may perform the operations of the method for processing historical browsing content provided in the embodiment of the disclosure, the instructions can implement beneficial effects that may be implemented by the method for processing historical browsing content provided in the embodiments of the disclosure. For details, reference may be made to the foregoing embodiments. Details are not described herein again.

According an aspect of the disclosure, a computer program product or a computer program is further provided. The computer program product or the computer program includes computer instructions, and the computer instructions are stored in a computer-readable storage medium. A processor of an electronic device reads the computer instructions from the computer-readable storage medium, and executes the computer instructions, so that the electronic device performs the method provided in various implementations in the foregoing embodiments.

A method and apparatus for processing historical browsing content, an electronic device and a storage medium provided in the embodiments of the disclosure are described in detail above. The principle and implementations of the disclosure are described herein by using specific examples. The descriptions of the foregoing embodiments are merely used for helping understand the method and the core idea of the disclosure. Meanwhile, a person skilled in the art may make modifications in terms of the specific implementations and application scopes according to the idea of the disclosure. In conclusion, the content of this specification should not be understood as a limitation to the disclosure.

What is claimed is:

1. A method for processing historical browsing content, performed by an electronic device, the method comprising:

generating a first user operation page of a target application;

in response to a historical reference operation triggered via the first user operation page, generating a browsing record page, the browsing record page comprising at least one historical content area, each historical content area corresponding to a different content type, each historical content area comprising at least one first content description information, and each at least one first content description information of a respective historical content area being used for describing historical browsing content under a content type corresponding to the historical content area;

in response to a presenting operation for the at least one first content description information selected from the historical content area, generating target historical browsing content corresponding to the selected at least one first content description information; and in response to determining that the target historical browsing content reached a pre-set end position after presenting the target historical browsing content, deleting the target historical browsing content, wherein the target historical browsing content comprises browsing information (i) containing subject matter related to a respective content type associated with the at least one first content description and (ii) different from the at least one first content description, wherein the target historical browsing content is accessed through link information from another application different from the target application in which a server of the another application is accessed through the link information to acquire the target historical browsing content, wherein the target historical browsing content is presented in a sub-page separate from a page in which the at least one first content description information is presented, and wherein the target historical browsing content includes a live broadcast and the link to the live broadcast becomes invalid when the live broadcast ends.

2. The method according to claim 1, wherein the historical browsing content is content that has been browsed within a historical time period in the target application; the first user operation page comprises a session list page, and the session list page comprises a session flow of a user of the target application; and the generating the browsing record page comprises:

in response to a pull-down operation for the session list page, generating the browsing record page.

3. The method according to claim 1, wherein the first user operation page comprises a first content viewing control; and the generating the browsing record page comprises:

in response to a viewing operation for the first content viewing control, generating the browsing record page.

4. The method according to claim 1, wherein the generating the browsing record page comprises: based on a user preference degree of the content type corresponding to a respective historical content area, determining a presenting position of the respective historical content area in the browsing record page, wherein the higher the user preference degree of the content type, the more forward the presenting position of the respective historical content area corresponding to the content type in the browsing record page.

5. The method according to claim 1, wherein the generating the browsing record page comprises: based on a time interval between latest browsing time of the historical browsing content corresponding to the at least one first content description information and current moment, determining a position arrangement order of the at least one first content description information in a same historical content area.

6. The method according to claim 1, wherein each historical content area further comprises a second content viewing control, and the method further comprises:

in response to a triggering operation for the second content viewing control in a selected historical content area, displaying a content viewing page of a target content type corresponding to the selected historical content area, the content viewing page comprising second content description information of at least one historical browsing content under the target content type, wherein the second content description information of each historical browsing content is used for describing information of the historical browsing content; and in response to a presenting operation for selected second content description information, presenting historical browsing content corresponding to the selected second content description information.

7. The method according to claim 1, wherein the historical browsing content comprises content that has been browsed within a historical time period and has not been completely browsed in the target application.

8. The method according to claim 7, wherein the generating target historical browsing content corresponding to the selected first content description information comprises:

in response to the presenting operation for the selected first content description information, acquiring a latest content presenting position of the target historical browsing content corresponding to the selected first content description information, the latest content presenting position being a user browsing progress position in a case that latest presentation of the target historical browsing content ends; and based on the latest content presenting position of the target historical browsing content, generating the target historical browsing content.

9. The method according to claim 1, further comprising:

in response to a deleting operation for the at least one first content description information, deleting the at least one first content description information corresponding to the deleting operation from the historical content area.

10. The method according to claim 1, wherein the generating the browsing record page comprises:

in response to the historical reference operation for the first user operation page, acquiring a historical browsing content set corresponding to each content type, each historical browsing content set comprising at least one first content description information; and based on the at least one first content description information in the historical browsing content set under the each content type, generating the browsing record page.

11. The method according to claim 10, wherein the at least one first content description information of the historical browsing content comprises link information of the historical browsing content; before the based on the at least one first content description information in the historical browsing content set under the each content type, generating the browsing record page, the method further comprises:

detecting validity of the link information of the at least one first content description information, and determining invalid link information in the link information based on a detection result; and deleting the at least one first content description information corresponding to the invalid link information from the historical browsing content set.

12. The method according to claim 10, further comprising:

generating a second user operation page of the target application, the second user operation page comprising at least one access entry for content under the content type;

in response to an access operation for a selected access entry, generating a content presenting page, and presenting target content corresponding to the selected access entry via the content presenting page, wherein the content presenting page comprises an important content marking control; and in response to a triggering operation for the important content marking control, acquiring first content description information, provided with an important content identification, of the target content, and storing the first content description information provided with the important content identification into a historical browsing content set under a corresponding content type.

13. The method according to claim 12, wherein the generating the browsing record page comprises:

in the historical content area, preferentially arranging the at least one first content description information provided with the important content identification; and in a case that there is a free position in the historical content area after arranging the at least one first content description information provided with the important content identification, arranging the at least one first content description information without the important content identification at the free position in an order that a time interval between the latest browsing time and current moment becomes longer.

14. The method according to claim 10, further comprising:

generating a second user operation page of the target application, the second user operation page comprising at least one access entry for content under the content type;

in response to an access operation for a selected access entry, generating a content presenting page, and presenting target content corresponding to the selected access entry via the content presenting page;

in response to a browsing end operation for the content presenting page, closing the content presenting page; and in a case that the presented target content does not reach a pre-set browsing end position, acquiring first content description information, provided with a latest content presenting position, of the target content, and storing the at least one first content description information provided with the latest content presenting position into a corresponding historical browsing content set.

15. The method according to claim 10, further comprising:

detecting a current browsing position of the target historical browsing content; and in a case that the current browsing position satisfies conditions of a browsing end position, determining that browsing of the target historical browsing content is completed, deleting the at least one first content description information of the target historical browsing content from the historical browsing content set, and deleting the at least one first content description information of the target historical browsing content from the historical content area.

16. The method according to claim 10, further comprising:

generating a second user operation page of the target application, the second user operation page comprising at least one access entry for content under the content type;

in response to an access operation for a selected access entry, generating a content presenting page, and presenting target content corresponding to the selected access entry via the content presenting page;

in response to a browsing end operation for the content presenting page, closing the content presenting page; and in a case that a continuous browsing duration of the presented target content is not less than a shortest browsing duration, acquiring first content description information of the target content, and storing the at least one first content description information into a corresponding historical browsing content set.

17. An apparatus for processing historical browsing content comprising:

at least one memory configured to store program code; and at least one processor configured to read the program code and operate as instructed by the program code, the program code comprising:

first operation page generating code, configured to cause the at least one processor to generate a first user operation page of a target application;

browsing record page generating code, configured to, in response to a historical reference operation triggered via the first user operation page, cause the at least one processor to generate a browsing record page, the browsing record page comprising at least one historical content area, each historical content area corresponding to a different content type, each historical content area comprising at least one first content description information, and each at least one first content description information of a respective historical content area being used for describing historical browsing content under a content type corresponding to the historical content area;

content re-presenting code, configured to, in response to a presenting operation for the at least one first content description information selected from the historical content area, cause the at least one processor to generate target historical browsing content corresponding to the selected at least one first content description information; and deleting code, configured to, in response to a determination that the target historical browsing content reached a pre-set end position after presenting the target historical browsing content, cause the at least one processor to delete the target historical browsing content, wherein the target historical browsing content comprises browsing information (i) containing subject matter related to a respective content type associated with the at least one first content description and (ii) different from the at least one first content description, wherein the target historical browsing content is accessed through link information from another application different from the target application in which a server of the another application is access through the link information to acquire the target historical browsing content, wherein the target historical browsing content is presented in a sub-page separate from a page in which the at least one first content description information is presented, and wherein the target historical browsing content includes a live broadcast and the link to the live broadcast becomes invalid when the live broadcast ends.

18. The apparatus according to claim 17, wherein the historical browsing content is content that has been browsed within a historical time period in the target application; the first user operation page comprises a session list page, and the session list page comprises a session flow of a user of the target application; and the browsing record page generating code is further configured to cause the at least one processor to:

in response to a pull-down operation for the session list page, generate the browsing record page.

19. The apparatus according to claim 17, wherein the first user operation page comprises a first content viewing control; and the browsing record page generating code is configured to cause the at least one processor to:

in response to a viewing operation for the first content viewing control, generate the browsing record page.

20. A non-transitory computer-readable storage medium, storing a computer program that when executed by at least one processor causes the at least one processor to:

generate a first user operation page of a target application;

in response to a historical reference operation triggered via the first user operation page, generate a browsing record page, the browsing record page comprising at least one historical content area, each historical content area corresponding to a different content type, each historical content area comprising at least one first content description information, and each at least one first content description information of one historical content area being used for describing historical browsing content under a content type corresponding to the historical content area; and in response to a presenting operation for the at least one first content description information selected from the historical content area, generate target historical browsing content corresponding to the selected at least one first content description information, in response to t determining that the target historical browsing content reached a pre-set end position after presenting the target historical browsing content, deleting the target historical browsing content, wherein the target historical browsing content comprises browsing information (i) containing subject matter related to a respective content type associated with the at least one first content description and (ii) different from the at least one first content description, wherein the target historical browsing content is accessed through link information from another application different from the target application in which a server of the another application is access through the link infor-
mation to acquire the target historical browsing con-
tent, wherein the target historical browsing content is presented
in a sub-page separate from a page in which the at least
one first content description information is presented,
and wherein the target historical browsing content includes a
live broadcast and the link to the live broadcast
becomes invalid when the live broadcast ends.

* * * * *